United States Patent [19]
Johnston

[11] 3,813,788
[45] June 4, 1974

[54] DYNAMIC PENDULUM NORTH-SEEKING GYRO APPARATUS

[75] Inventor: James V. Johnston, Huntsville, Ala.

[73] Assignee: The United States of America as represented by the Secretary of the Army, Washington, D.C.

[22] Filed: Feb. 22, 1972

[21] Appl. No.: 228,302

Related U.S. Application Data

[63] Continuation of Ser. No. 11,156, Feb. 13, 1970, abandoned.

[52] U.S. Cl. .................................... 33/321, 33/323
[51] Int. Cl. ........................................... G01c 19/38
[58] Field of Search ............................. 33/321, 323

[56] References Cited
UNITED STATES PATENTS

| | | | |
|---|---|---|---|
| 1,930,082 | 10/1933 | Boykow | 33/321 |
| 2,893,248 | 7/1958 | Ecary | 33/321 X |
| 2,902,772 | 9/1959 | Ciscel | 33/321 |
| 2,985,023 | 5/1961 | Weiss et al. | 33/321 X |

Primary Examiner—Robert B. Hull
Attorney, Agent, or Firm—Edward J. Kelly; Herbert Berl; Aubrey J. Dunn

[57] ABSTRACT

A gyro that is free about its vertical axis is carried on a vertical stabilized gimbal. The gimbal is the innermost (inner) of three gimbals, and is supported for rotation about a horizontal north-seeking axis by a middle gimbal. The middle gimbal is supported for rotation about an azimuth axis by the outermost (outer) gimbal. The outer gimbal is able to rotate about a primary horizontal axis and is supported by a housing. The housing may be earth-fixed or so carried by a vehicle that the primary axis journals are stabilized level and approximately E-W. The designated axes are not necessarily the same as the vehicle axes, but are used only to show axes of the north-seeking system. The system may be isolated from the vehicle axes. The free gyro tends to align itself with a north-south line. An output is taken indicative of the relative positions of the gimbal of the free gyro and the north-seeking axis. This output is used as an input both to an azimuth rate integrating single-degree gyro for the inner gimbal, and as one input to a summer feeding the torquer of a single-degree N-S tilt rate integrating gyro on the inner gimbal. The other input to the summer is provided by a N-S tilt sensor carried by the outer gimbal. The output of the azimuth gyro is fed to a torquer between the outer gimbal and the middle gimbal. The output of the N-S tilt rate integrating gyro is fed to a torquer between the housing and the outer gimbal. With this overall arrangement, the free gyro acts like a pendulum, and its spin axis describes an ellipse around a north-south line. Therefore, the mean direction of the spin axis of the free gyro is a north-south line, and the horizontal supporting axis of the inner gimbal seeks a north-south direction.

2 Claims, 1 Drawing Figure

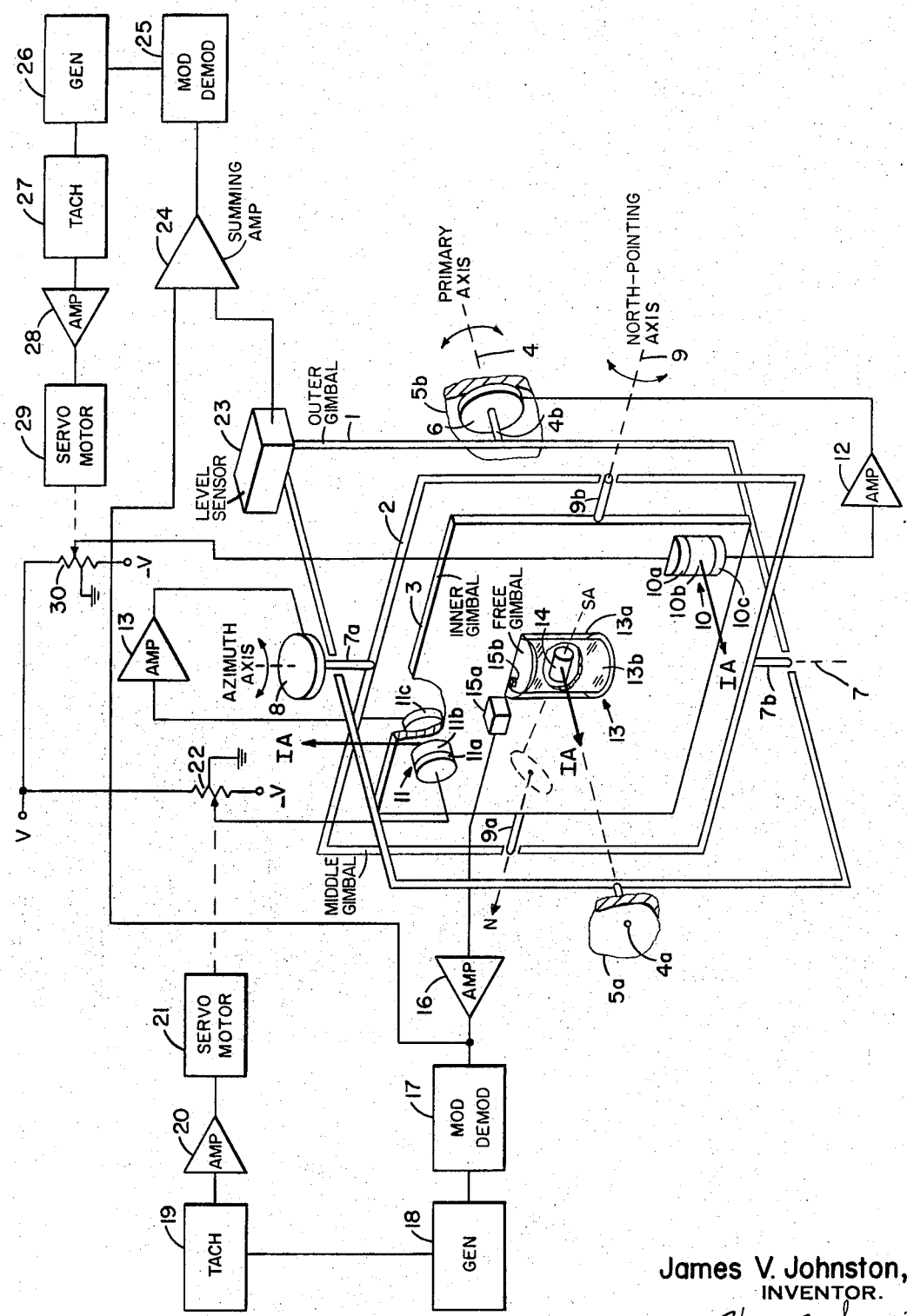

DYNAMIC PENDULUM NORTH-SEEKING GYRO APPARATUS

REFERENCE TO RELATED APPLICATION

This application is a continuation of my prior application of the same title, bearing Ser. No. 11,156, filed Feb. 13, 1970, now abandoned

BACKGROUND OF THE INVENTION

Various types of pendulous north-seeking gyro are known in the art, such as those shown in my U.S. Pat. Nos. 3,173,215 and 3,173,216, both issued Mar. 16, 1965. Other types are those shown in U.S. Pat. Nos. 3,146,530, issued Sept. 1, 1964; 3,229,376, issued Jan. 18, 1966; and 3,307,412, issued Mar. 7, 1967. These gyros have various deficiencies which the instant invention is able to avoid. Specifically, these gyros have unbalanced masses (necessary for true pendulous gyros), which masses affect the gyro accuracies in the presence of accelerations. Some of the known pendulous gyros require that the pendulums therein be at rest for an output to be obtained. This has obvious disadvantages from bias, etc. The instant invention overcomes these deficiencies by being dynamically balanced, and using a dynamic pendulum.

SUMMARY OF THE INVENTION

A gyro that is free about its vertical axis is carried on a vertical stabilized gimbal. The gimbal is the innermost (inner) of three gimbals, and is supported for rotation about a normally horizontal north-seeking axis by a middle gimbal. The middle gimbal is supported for rotation about an azimuth axis by the outermost (outer) gimbal. The outer gimbal is able to rotate about a primary horizontal axis and is supported by a housing. The housing may be earth-fixed or carried by a vehicle. The free gyro tends to align itself with a north-south line. An output is taken indicative of the relative positions of the gimbal of the free gyro and the north-seeking axis This output is used as an input both to an azimuth rate integrating single-degree gyro for the inner gimbal, and as one input to a summer feeding the torquer of a single-degree N-S tilt rate integrating gyro on the inner gimbal. The outer input to the summer is provided by a level sensor carried by the outer gimbal. The output of the azimuth gyro is fed to a torquer between the outer gimbal and the middle gimbal. The output of the N-S tilt rate integrating gyro is fed to a torquer between the housing and the outer gimbal. With this overall arrangement, the free gyro acts like a pendulum, and its spin axis effectively describes an ellipse around a north-south line. Therefore, the mean direction of the spin axis of the free gyro is a north-south line, and the normally horizontal supporting axis of the inner gimbal seeks a north-south direction.

BRIEF DESCRIPTION OF THE DRAWING

The single drawing FIGURE is a schematic showing of the invention.

DESCRIPTION OF THE PREFERRED EMBODIMENT

Referring to the single drawing FIGURE, numerals 1, 2, and 3 respectively designate the outer, middle and inner gimbals of the invention. Outer gimbal 1 is supported along a primary axis 4 by axle 4a–4b. Portion 4a of the axle is supported for rotation by portion 5a of a housing. Portion 4b of the axle is supported for rotation by torquer 6, which torquer is carried by portion 5b of the housing. It should be understood that the housing (shown only by broken portions 5a and 5b) may be earth-fixed or may be carried by vehicles, such as ships, airplanes, missiles, trucks, etc. The primary axis direction established by housing portions 5a and 5b is in either case maintained level and approximately east-west.

Middle gimbal 2 is supported by an azimuth axle 7a–7b. End 7b of the azimuth axle is carried by outer gimbal 1, and end 7a of the axle is supported for rotation by torquer 8. As can be seen, torquer 8 is carried by the outer gimbal.

Inner gimbal 3 is supported by normally horizontal north-seeking axle 9a-9b, which axle is carried by middle gimbal 2, and is rotatable in the middle gimbal. There are three gyros associated with gimbal 3.

One of the gyros associated with gimbal 3 is free vertical gimballed gyro 13. This gyro has fixed to the inner gimbal a cylindrical outer housing 13a enclosing an inner housing 13b. The inner housing is free to rotate within the outer housing about their normally vertical common axis and may be carried by bearings (not shown) between the housings, or by an air bearing. Inner housing 13b contains gyro mass 14, represented in the figure through a cut-away portion of the housing with its spin axis (SA) aligned with the north-seeking axis of the inner gimbal. A pickoff is provided to determine the angular position of inner housing 13b with respect to the north-seeking horizontal support axis 9 of gimbal 3, and consists of portion 15a mounted on the gimbal, and 15b mounted on 13b. This pickoff may take the form as described in my above mentioned patents. Since mass 14 is supported by a free gimbal, it will swing to a N-S line, as taught, for example, in U.S. Pat. No. 3,146,530 of Sept. 1, 1964 of which the instant inventor was a joint inventor.

Rate integrating gyro 10 controls pitch of gimbal 3 and includes torquer 10a, gyro mass 10b, and pickoff 10c. Rate integrating gyro 11 controls azimuth of gimbal 3 and includes torquer 11a, gyro mass 11b, and pickoff 11c. As can be seen, 10c feeds the outer gimbal torquer (numeral 6). This torquer varies the N-S tilt of inner gimbal 3 by rotating end 4b of the axle of outer gimbal 1. Pickoff 11c feeds the middle gimbal torquer (numeral 8). This torquer provides azimuth alignment of the inner gimbal by rotating end 7a of the azimuth axle of middle gimbal 2. Pickoffs 10c and 11c have respective amplifiers 12 and 12a connected in circuit with their respective torquers. As can be seen on the drawings, the input axis of gyro 10 is normally horizontal and perpendicular to north-seeking axis 9 of inner gimbal 3. The input axis of gyro 11 is generally vertical and perpendicular to axis 9. The spin axis of 14 describes an ellipse as shown in the figure. Its spin axis is allowed to sweep back and forth through the inner gimbal axis 9. This ellipse will be centered about the north direction. The north-pointing axis will move to center itself within the ellipse. Vertical motion in the ellipse comes from the motion of the outer gimbal about the primary axis as it tilts up and down.

The output from 15a is fed to amplifier 16. The output of amplifier 16 is fed through a servo loop including a modulator-demodulator 17, generator 18, tachometer 19, amplifier 20, and servo motor 21. Motor 21 is mechanically coupled to the movable contact of potentiometer 22. This contact picks up a D-C voltage between points V and −V. Potentiometer 22 has a grounded center tap. The voltage from 22 is fed as an input to torquer 11a of gyro 11.

Mounted on outer gimbal 1 is a level sensor 23. This sensor provides a signal indicative of deviation of the outer gimbal about said primary axis 4, and may take the form as described in my above mentioned patents. The output of 23 is fed as one of two inputs to summing amplifier 24. The other input at 24 is from the output of amplifier 16. The output of 24 is fed into a servo loop including modulator-demodulator 25, generator 26, tachometer 27, amplifier 28, and servo motor 29. The movable contact of potentiometer 30 is mechanically controlled by servo motor 29, and picks up voltage across points V and −V. Potentiometer 30 has a grounded center tap. The voltage from 30 is fed to torquer 10a of gyro 10.

The cross coupling from pickoff portion 15a to torquer 11a and the combination of signals from level sensor 23 and pickoff portion 15a to torquer 10a causes the spin axis of mass 14 to describe an ellipse about a north-south line through movement of gimbals 1 and 2 about respective axes 4 and 7.

The inventive north-seeking gyro is initially set up with the free gimballed inner housing 13b caged (by means not shown). The inner gimbal is erected, and aligned approximately with north. Inner housing 13b is uncaged and swings toward north. As it swings, an output is provided from 15a. This output causes the inner gimbal to follow the free gimbal by way of the servo loops and gyro 11. The free gimballed gyro will eventually begin to oscillate about a north-south line. The inner gimbal will also oscillate about the north-south line, but to a much less extent than the free gimbal. If the free gimbal were to oscillate through an arc of 30°, the inner gimbal would oscillate through an arc of only 1'. The free gimballed gyro is caused to "nod" or oscillate about axis 4 relative to the housing shown at 5a and 5b because of an output from 16 (associated with azimuth) fed into summing amplifier 24 (associated with pitch). The gaims in the servo loops must be adjusted to cause the free gimballed gyro to go into a limit cycle.

Obviously, the invention must be used on or near the earth to properly operate. A fourth gyro would normally be used for stabilization and erection around the axis of shaft 9a–9b, but has not been shown in the description of the invention, since it does not comprise part of the invention, per se. The modulator-demodulators in the servo loops may include standard lead-lag networks.

I claim:

1. A dynamic pendulum north-seeking gyro apparatus including:
   a first gimbal mounted for rotation about a first substantially horizontal axis;
   a second gimbal mounted on said first gimbal for rotation about a substantially vertical axis;
   a third gimbal mounted on said second gimbal for rotation about a second axis substantially horizontal and orthogonal to said first axis;
   a housing fixedly carried by said third gimbal;
   a first gyroscopic mass within said housing, and means supporting it therefrom with its spin axis substantially parallel to said second substantially horizontal axis of said third gimbal and said supporting means being mounted for rotation about a vertical axis relative to said second axis;
   means for determining the relative positions of the spin axis of said gyro mass and said second axis and giving an output signal responsive thereto;
   a first rate integrating gyro carried by said third gimbal, comprising: a first torquer, a second gyro mass, and a first pickoff, with the input axis of said first rate integrating gyro orthogonal to said second axis and normally vertical whereby said pickoff has an output related to angular displacement of said second gimbal about said substantially vertical axis;
   a second rate integrating gyro carried by said third gimbal, comprising: a second torquer, a third gyro mass, and a second pickoff, with the input axis of said second rate integrating gyro orthogonal to said second axis and normally horizontal, whereby said pickoff has an output related to angular displacement of said third gimbal about said first axis;
   means responsive to the output signal of said means for determining for providing a signal to said first torquer;
   level sensing means carried by said first gimbal for providing an output signal related to annular displacement of said fist gimbal about said first axis;

means responsive both to the output signal from said level sensing means and said means for determining for providing a singal to said second torquer; and means associated with said first and second gimbals and said second and first pickoffs respectively for rotating said first and second gimbals respectively about said first axis and said substantially vertical axis in response to output from said pickoffs.

2. The north-seeking gyro apparatus as recited in claim 1, wherein said means associated with includes:
   a third torquer connected to said second pickoff and attached to said first gimbal for rotating said first gimbal about said first axis; and
   a fourth torquer connected to said first pickoff and attached between said first and second gimbals to impart relative motion therebetween.

* * * * *